(12) United States Patent
Liao

(10) Patent No.: US 9,168,704 B2
(45) Date of Patent: Oct. 27, 2015

(54) MANUFACTURING METHOD OF AN ACTIVATED-CARBON FILTER ELEMENT

(71) Applicant: I-Chung Liao, Taichung (TW)

(72) Inventor: I-Chung Liao, Taichung (TW)

( * ) Notice: Subject to any disclaimer, the term of this patent is extended or adjusted under 35 U.S.C. 154(b) by 293 days.

(21) Appl. No.: 13/832,926

(22) Filed: Mar. 15, 2013

(65) Prior Publication Data

US 2014/0265019 A1 Sep. 18, 2014

(51) Int. Cl.

| | |
|---|---|
| *B29C 43/46* | (2006.01) |
| *B01D 29/48* | (2006.01) |
| *B29C 70/58* | (2006.01) |
| *B29C 70/50* | (2006.01) |
| B29C 53/56 | (2006.01) |
| B29L 31/14 | (2006.01) |

(52) U.S. Cl.
CPC .............. *B29C 70/58* (2013.01); *B29C 70/506* (2013.01); *B29C 70/508* (2013.01); *B29C 53/562* (2013.01); *B29L 2031/14* (2013.01)

(58) Field of Classification Search
CPC .............. B29C 43/46; B29C 2043/462; B29C 2043/486; B29C 2043/467; B29C 43/24; B29C 70/58; B01D 29/0006; B01D 29/0027
See application file for complete search history.

(56) References Cited

U.S. PATENT DOCUMENTS

| | | | | |
|---|---|---|---|---|
| 2,926,100 | A * | 2/1960 | Weigle et al. ................. | 427/194 |
| 3,015,367 | A * | 1/1962 | Smith et al. ..................... | 96/135 |
| 3,042,216 | A * | 7/1962 | Goldman ................... | 210/494.2 |
| 3,268,084 | A * | 8/1966 | Allman, Jr. et al. ........... | 210/503 |
| 3,692,618 | A * | 9/1972 | Dorschner et al. ............ | 442/401 |
| 3,704,198 | A * | 11/1972 | Prentice ........................ | 428/198 |
| 3,855,045 | A * | 12/1974 | Brock ........................... | 428/198 |
| 3,998,988 | A * | 12/1976 | Shimomai et al. ............ | 428/400 |
| 4,264,644 | A * | 4/1981 | Schaetti ........................ | 427/557 |
| 4,652,322 | A * | 3/1987 | Lim .............................. | 156/181 |
| 4,701,365 | A * | 10/1987 | Iwasaki ......................... | 428/171 |
| 4,731,135 | A * | 3/1988 | Tani et al. .................... | 156/62.6 |
| 4,741,949 | A * | 5/1988 | Morman et al. .............. | 442/329 |
| 4,748,065 | A * | 5/1988 | Tanikella ...................... | 428/152 |
| 4,797,318 | A * | 1/1989 | Brooker et al. ............... | 442/344 |
| 5,328,758 | A * | 7/1994 | Markell et al. ............... | 442/351 |
| 5,382,400 | A * | 1/1995 | Pike et al. .................... | 264/168 |
| 5,498,468 | A * | 3/1996 | Blaney .......................... | 428/198 |
| 5,635,290 | A * | 6/1997 | Stopper et al. ................ | 428/198 |
| 5,711,994 | A * | 1/1998 | Powers ....................... | 427/255.6 |
| 5,944,933 | A * | 8/1999 | Heller et al. .................. | 156/276 |
| 5,972,147 | A * | 10/1999 | Janis ............................. | 156/181 |
| 6,060,003 | A * | 5/2000 | Karszes ....................... | 264/1.34 |
| 6,423,123 | B1 * | 7/2002 | Rosenberg et al. ............ | 96/154 |
| 2010/0151760 | A1* | 6/2010 | Laura et al. .................. | 442/364 |

* cited by examiner

*Primary Examiner* — Matthew Daniels

(74) *Attorney, Agent, or Firm* — Alan D. Kamrath; Kamrath IP Lawfirm, P.A.

(57) ABSTRACT

A manufacturing method of an activated-carbon filter element has the steps of preparing a non-woven cloth, spreading activated-carbon powders, combining the activated-carbon powders with the non-woven cloth, and winding. In the step of spreading the activated-carbon powders, the activated-carbon powders are scattered onto the non-woven cloth by a scattering device. In the step of combining the activated-carbon powders with the non-woven cloth, the non-woven cloth is hot pressed by a hot pressing cylinder, and is melted. The activated-carbon powders are securely combined with the non-woven cloth.

2 Claims, 7 Drawing Sheets

MANUFACTURING METHOD OF AN ACTIVATED-CARBON FILTER ELEMENT

BACKGROUND OF THE INVENTION

1. Field of the Invention

The present invention relates to a manufacturing method and, more particularly, to a manufacturing method of an activated-carbon filter element to increase the amount of activated-carbon powders attached to a non-woven cloth.

2. Description of Related Art

With reference to FIG. 7, a conventional manufacturing method of an activated-carbon filter element has the steps of:

A. Preparing a non-woven cloth:

A non-woven cloth is manufactured by a non-woven cloth apparatus.

B. Immersing:

The non-woven cloth is immersed in a solvent having activated-carbon powders and water, such that the activated-carbon powders are attached onto the non-woven cloth.

C. Drying:

The non-woven cloth is dried by a dryer to form an activated-carbon non-woven cloth.

D. Winding:

The activated-carbon non-woven cloth is wound to form an activated-carbon filter element.

However, the conventional manufacturing method of the activated-carbon filter element has the following drawbacks:

1. Low Amount of the Activated-Carbon Powders:

Because the activated-carbon powders are attached onto the non-woven cloth by immersion, instead of pressing, the activated-carbon non-woven cloth cannot receive many activated-carbon powders, and the activated-carbon powders fall easily off the activated-carbon non-woven cloth. Accordingly, the activated-carbon non-woven cloth has a low amount of the activated carbon powders, and does not filter the water very well.

2. Bad Distribution:

The activated-carbon powders are not evenly distributed in the solvent, so the activated-carbon powders cannot be evenly attached onto the non-woven cloth immersed in the solvent.

3. Easily Falling:

In the step of drying, the activated-carbon powders easily blow off by the dryer. Consequently, the fallen activated-carbon powders float in the air and cause air pollution.

4. Great Energy Consumption:

The dryer consumes lots of energy, so the conventional manufacturing method is costly.

In another conventional manufacturing method of an activated-carbon filter element, plastic resin and activated-carbon powders are prepared and then fused together to form an activated-carbon filter element. However, most of surface areas of the activated-carbon powders are covered by the resin, and the exposed surface areas, which are in contact with water, of the activated-carbon powders are small. The exposed surface areas may be lower than one-third of the total surface areas of the activated-carbon powders. Consequently, the filtering effect of the activated-carbon filter element is bad. More activated-carbon powders are necessarily added into the resin to increase the effective total exposed areas, and this costs a lot.

To overcome the shortcomings, the present invention provides a manufacturing method of an activated-carbon filter element to mitigate the aforementioned problems.

SUMMARY OF THE INVENTION

The main objective of the invention is to provide a manufacturing method of an activated-carbon filter element to increase the amount of activated-carbon powders attached to a non-woven cloth.

A manufacturing method of an activated-carbon filter element has the steps of: preparing a non-woven cloth, spreading activated-carbon powders, combining the activated-carbon powders with the non-woven cloth, and winding. In the step of spreading activated-carbon powders, the activated-carbon powders are scattered onto the non-woven cloth by a scattering device. In the step of combining the activated-carbon powders with the non-woven cloth, the non-woven cloth is hot pressed by a hot pressing cylinder, and is melted. The activated-carbon powders are securely combined with the non-woven cloth.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
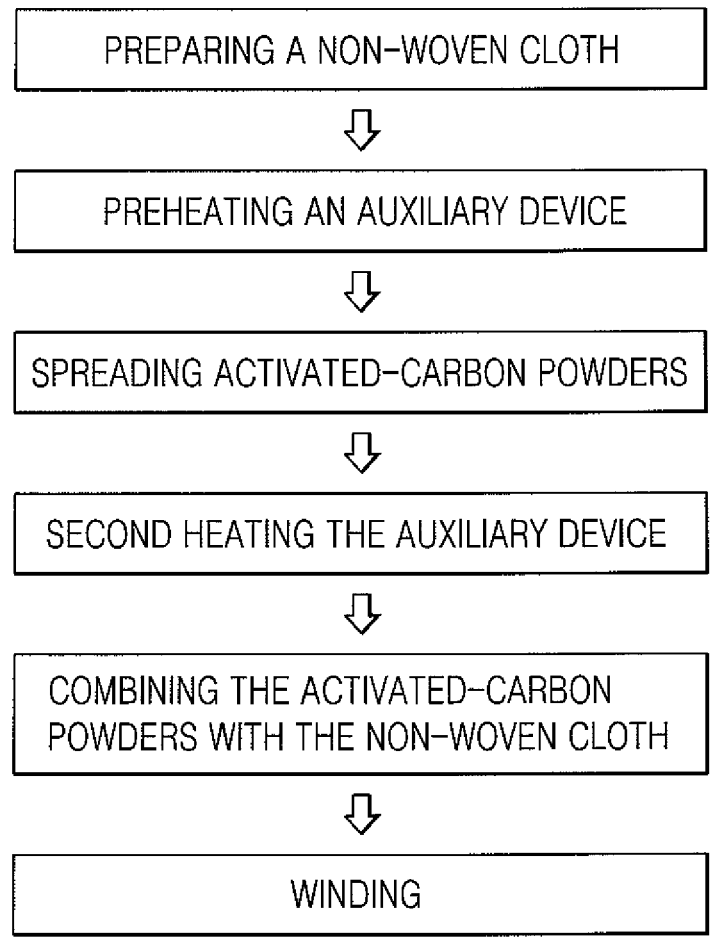
FIG. 1 is a block diagram of a manufacturing method of an activated-carbon filter element in accordance with the present invention.
Figure 2:
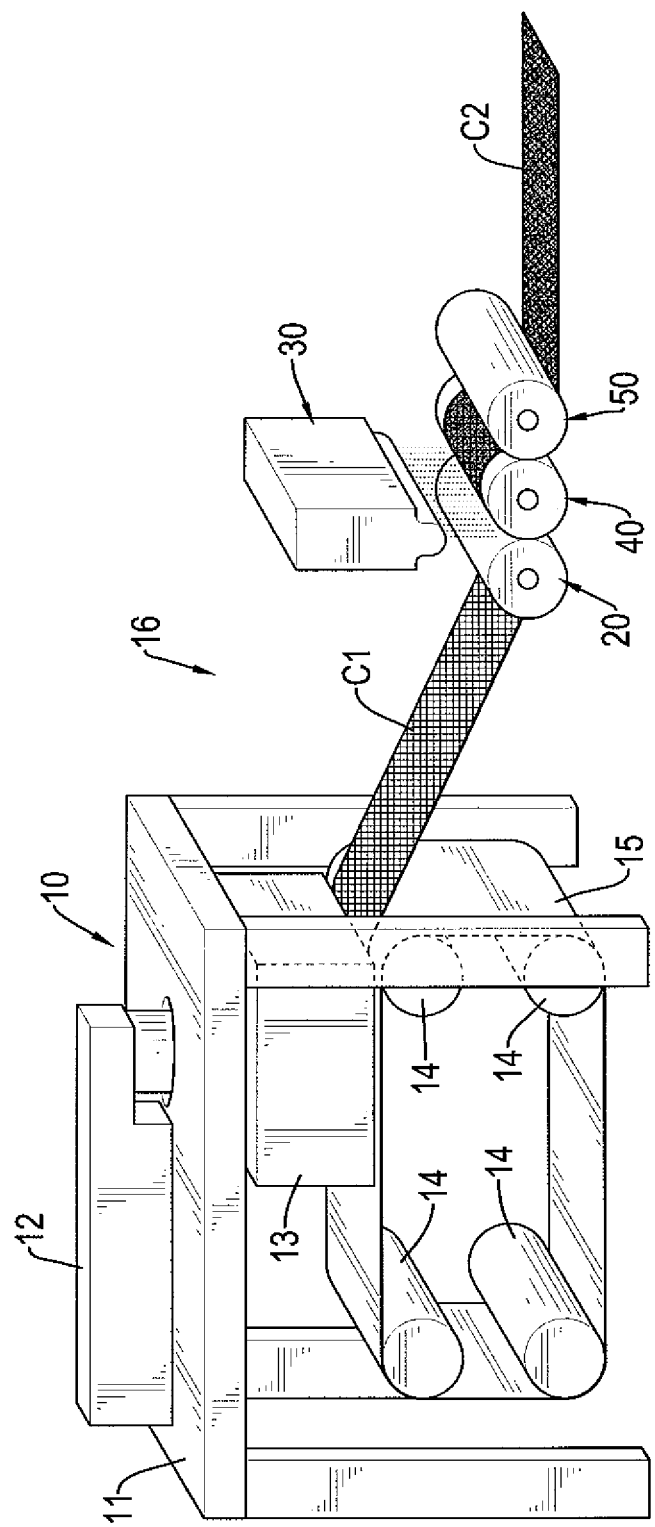
FIG. 2 is an operational perspective view of the manufacturing method of an activated-carbon filter element.
Figure 3:
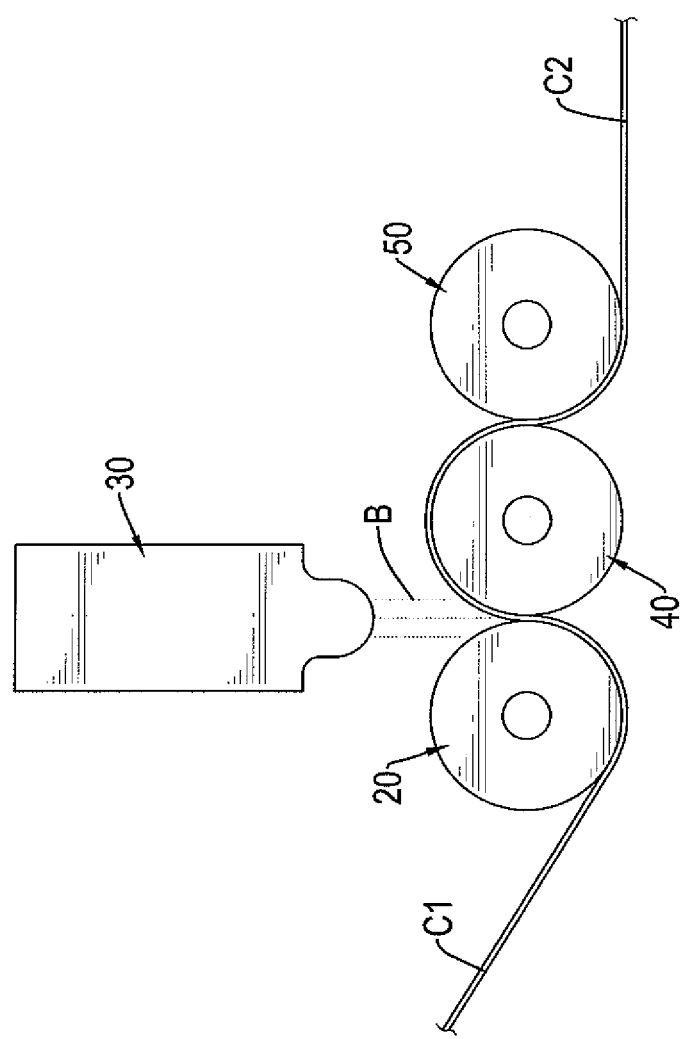
FIG. 3 is an enlarged side view of the manufacturing method of an activated-carbon filter element in FIG. 2.

With reference to FIGS. 1 to 3, a manufacturing method of an activated-carbon filter element in accordance with the present invention comprises the steps of:

A. Preparing a Non-Woven Cloth:

A non-woven cloth C1 is manufactured by a non-woven cloth apparatus 10. The non-woven cloth apparatus 10 has a main body 11, an extruder 12, an outlet 13, multiple conveyor cylinders 14, a conveyor belt 15 and a processing side 16. The extruder 12 is securely mounted on a top of the main body 11. The outlet 13 is mounted in the main body 11. The conveyor cylinders 14 are rotatably mounted in the main body 11. The conveyor belt 15 is located below the outlet 13, is mounted around the conveyor cylinders 14, and is driven by the conveyor cylinders 14 to rotate. The processing side 16 is located at a front side of the main body 11. The conveyor belt 15 continually moves the non-woven cloth C1 to the processing side 16 of the non-woven cloth apparatus 10. The non-woven cloth apparatus 10 may be conventional, and a detailed description is omitted.

B. Preheating an Auxiliary Device:

The auxiliary device has a preheating cylinder 20. The preheating cylinder 20 is preheated and the non-woven cloth C1 is hot pressed by the preheating cylinder 20.

C. Spreading Activated-Carbon Powders:

The activated-carbon powders B are scattered onto the non-woven cloth C1 by a scattering device 30 which is located at the processing side 16 of the non-woven cloth apparatus 10 and located above the preheating cylinder 20 and the non-woven cloth C1.

D. Second Heating the Auxiliary Device:

The auxiliary device further has a heating cylinder 40. The heating cylinder 40 is heated, and the non-woven cloth C1 is hot pressed by the preheating cylinder 20 and the heating cylinder 40. The non-woven cloth C1 is tightly pressed against a lower section of the preheating cylinder 20 and an upper section of the heating cylinder 40.

E. Combining the Activated-Carbon Powders with the Non-Woven Cloth:

The non-woven cloth C1 is hot pressed by a hot pressing cylinder 50, and is melted. The activated-carbon powders B are securely combined with the non-woven cloth C1 to form an activated-carbon non-woven cloth C2.

The activated-carbon non-woven cloth C2 is tightly pressed against a lower section of the hot pressing cylinder 50. The heating cylinder 40 is located between the preheating cylinder 20 and the hot pressing cylinder 50, and the heating cylinder 40, the preheating cylinder 20 and the hot pressing cylinder 50 are located at the same horizontal plane.

Preferably, a temperature of the preheating cylinder 20 is 100° C. (Celsius) and above, and is lower than that of the heating cylinder 40. A temperature of the hot pressing cylinder 50 is 160° C. (Celsius) and below, and is higher than that of the heating cylinder 40.

Figure 4:
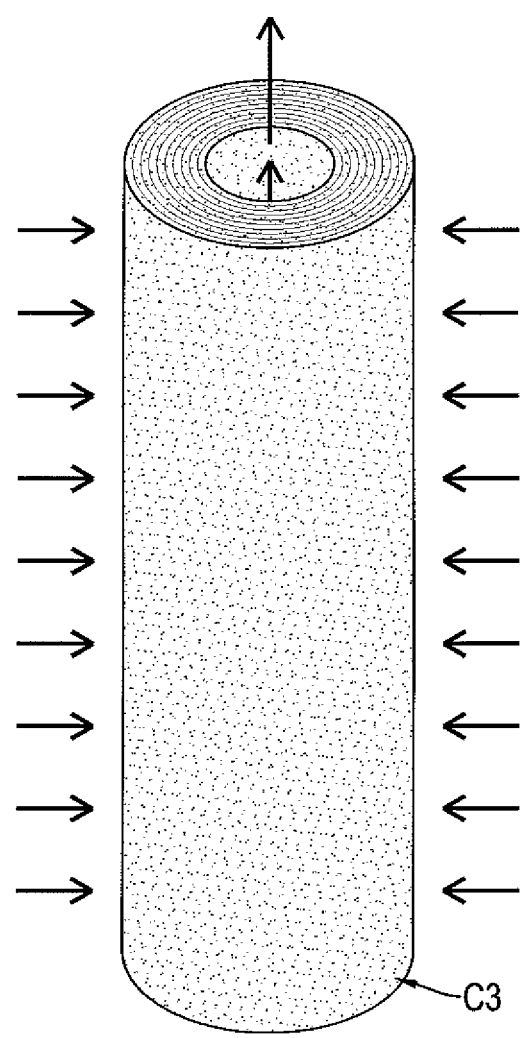
FIG. 4 is an operational perspective view of an activated-carbon filter element manufactured by the manufacturing method in accordance with the present invention.

F. Winding:

The activated-carbon non-woven cloth C2 is wound to form an activated-carbon filter element C3, as shown in FIG. 4.

The present invention may not have the step of preheating the auxiliary device and the step of second heating the auxiliary device. Instead, the hot pressing cylinder 50 is directly heated to 100° C. to 160° C., the hot pressing cylinder 50 melts the non-woven cloth C1, and the activated-carbon powders B are securely combined with the non-woven cloth C1. Accordingly, the step of preheating the auxiliary device and the step of second heating the auxiliary device are optional.

Figure 5:
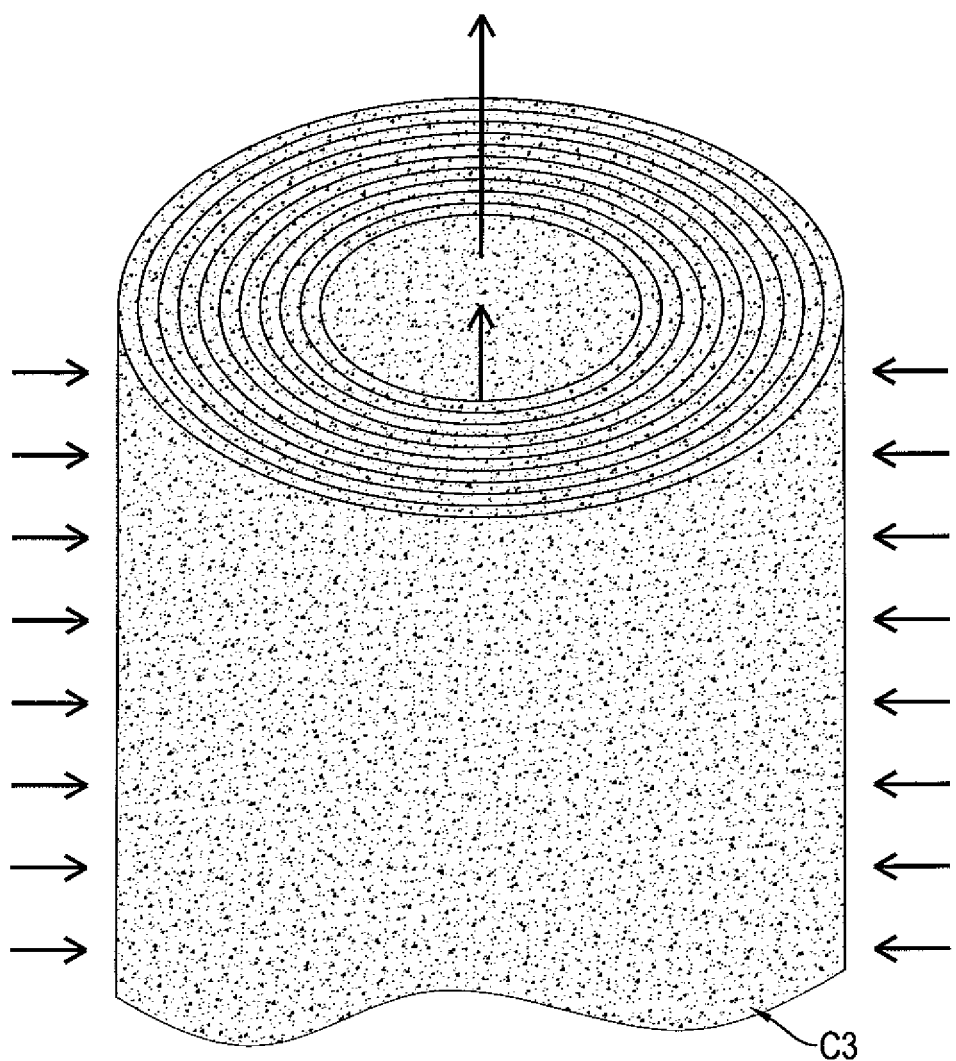
FIG. 5 is an enlarged perspective view in partial section of the activated-carbon filter element in FIG. 4.
Figure 6:
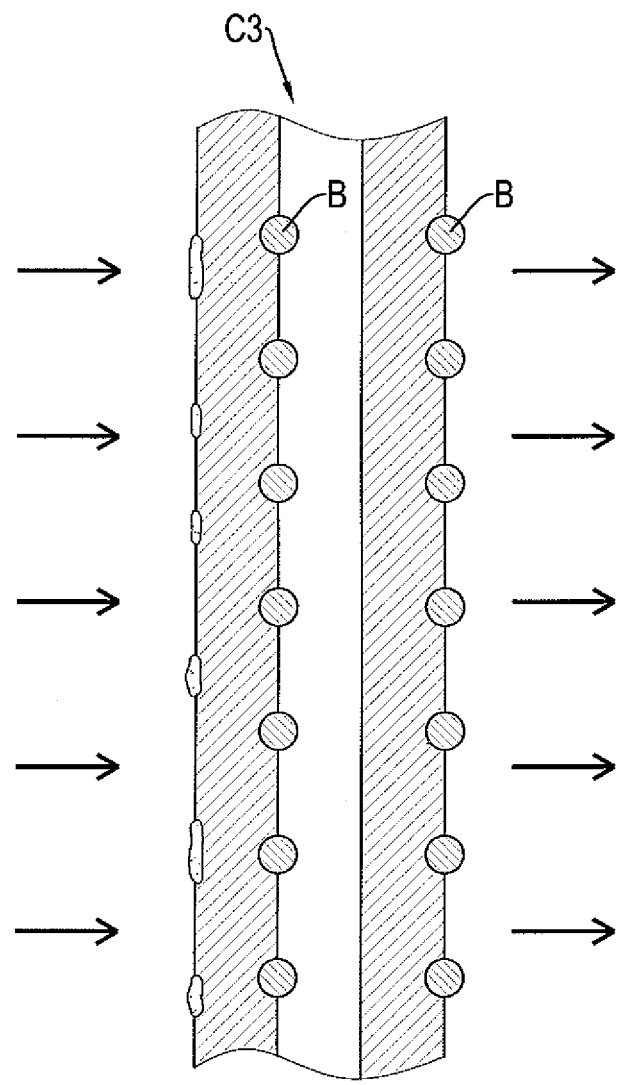
FIG. 6 is an enlarged and schematic view of the activated-carbon filter element in FIG. 4.
Figure 7:
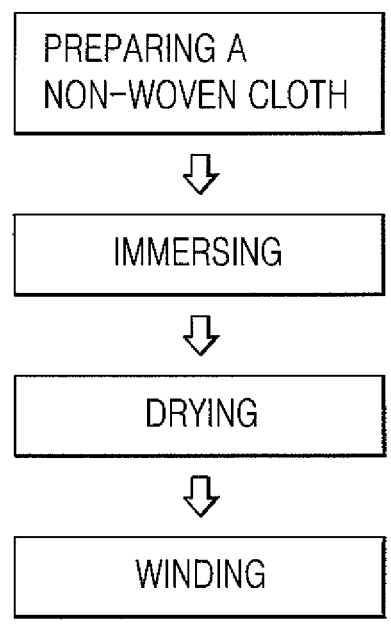
FIG. 7 is a block diagram of a conventional manufacturing method of an activated-carbon filter element.

With reference to FIGS. 4 to 6, the activated-carbon filter element C3 manufactured by the present invention is applied to filter water. When the water flows from an outer side to an inner side of the activated-carbon filter element C3, dust in the water is blocked by fibers of the activated-carbon filter element C3. Then, the smell of the water is absorbed by the activated carbon powders B. The activated carbon powders B can also absorb tiny dust. Accordingly, the activated-carbon filter element C3 can filter the water very well.

From the above description, it is noted that the present invention has the following advantages:

1. High Amount and Good Distribution:

In the step of spreading activated-carbon powders, the activated-carbon powders B are spread onto the non-woven cloth C1 evenly. In the step of combining the activated-carbon powders with the non-woven cloth, the non-woven cloth C1 can be combined securely with the activated-carbon powders B by hot pressing. Compared to the conventional manufacturing method, the present invention allows the activated-carbon filter element C3 to evenly receive more of the activated-carbon powders B. Accordingly, the activated-carbon filter element C3 has a large amount of activated-carbon powder B and has an excellent filtering effect.

2. Low Energy Consumption:

The present invention does not have the conventional step of drying, and does not need the conventional dryer. Accordingly, the present invention does not consume lots of energy and can greatly save manufacturing costs.

3. Controlling the Exposed Surface Areas of the Activated-Carbon Powders:

Compared to the conventional manufacturing method of fusion, the present invention can control the density of the activated-carbon powders B on the non-woven cloth C1, and the pressure applied on the activated-carbon powders B and the non-woven cloth C1. According, the total exposed areas of the activated-carbon powders B can be controlled and are large.

4. Secure Combination

The activated-carbon powders B and the non-woven cloth C1 are combined by hot pressing. Therefore, the activated-carbon powders B do not easily fall to cause air pollution.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A manufacturing method of an activated-carbon filter element comprising:

preparing a non-woven cloth, wherein the non-woven cloth is manufactured by a non-woven cloth apparatus, wherein the non-woven cloth apparatus has a conveyor belt continually moving the non-woven cloth to a processing side of the non-woven cloth apparatus;

spreading activated-carbon powders, wherein the activated-carbon powders are scattered onto the non-woven cloth by a scattering device located at the processing side of the non-woven cloth apparatus;

combining the activated-carbon powders with the non-woven cloth, wherein the non-woven cloth is hot pressed by a hot pressing cylinder and an auxiliary device and is melted, wherein the auxiliary device has a preheating cylinder and a heating cylinder located between the preheating cylinder and the hot pressing cylinder;

preheating the auxiliary device between preparing the non-woven cloth and spreading the activated-carbon powders, wherein preheating the auxiliary device includes preheating the preheating cylinder and pressing the non-woven cloth between the preheating cylinder and the heating cylinder;

second heating the auxiliary device between spreading the activated-carbon powders and combining the activated-carbon powders with the non-woven cloth, wherein second heating the auxiliary device includes heating the heating cylinder; and winding, wherein the activated-carbon non-woven cloth is wound to form an activated-carbon filter element.

2. The manufacturing method of an activated-carbon filter element as claimed in claim 1, wherein:

a temperature of the preheating cylinder is 100° C. (Celsius) and above, and is lower than that of the heating cylinder; and a temperature of the hot pressing cylinder is 160° C. (Celsius) and below, and is higher than that of the heating cylinder.

* * * * *